US010829009B2

(12) United States Patent
Antoniuk et al.

(10) Patent No.: US 10,829,009 B2
(45) Date of Patent: Nov. 10, 2020

(54) VEHICLE SEAT HEIGHT ADJUSTMENT MECHANISM

(71) Applicant: Faurecia Automotive Seating, LLC, Auburn Hills, MI (US)

(72) Inventors: Mateusz Antoniuk, Grojec (PL); Jacek Miszczak, Grojec (PL); Andreas Rohlfing, Stadthagen (DE)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 41 days.

(21) Appl. No.: 16/020,050

(22) Filed: Jun. 27, 2018

(65) Prior Publication Data
US 2020/0001748 A1    Jan. 2, 2020

(51) Int. Cl.
*B60N 2/16* (2006.01)
*B60N 2/02* (2006.01)

(52) U.S. Cl.
CPC .......... *B60N 2/164* (2013.01); *B60N 2/0232* (2013.01); *B60N 2/165* (2013.01); *B60N 2002/0236* (2013.01)

(58) Field of Classification Search
CPC ...... B60N 2/164; B60N 2/0232; B60N 2/165; B60N 2/16
USPC ....... 248/154, 419, 422, 161, 404, 405, 415, 248/416; 297/344.12
See application file for complete search history.

(56) References Cited

U.S. PATENT DOCUMENTS

| 1,228,434 | A | * | 6/1917 | Hedberg | B66F 3/16 254/103 |
| 2,890,010 | A | * | 6/1959 | Barkheimer | A47B 9/04 108/7 |
| 3,347,511 | A | * | 10/1967 | Myers | B65G 27/08 248/422 |
| 3,568,972 | A | * | 3/1971 | Sherman | B64D 11/0689 248/419 |
| 3,612,468 | A | * | 10/1971 | Hoppl | A61B 90/25 248/405 |
| 4,279,398 | A | * | 7/1981 | Pregnall | A47C 3/24 114/363 |
| 4,552,403 | A | * | 11/1985 | Yindra | A61G 13/02 108/147 |
| 4,577,827 | A | * | 3/1986 | Eliscu | F16M 11/08 248/183.4 |
| 4,640,485 | A | * | 2/1987 | Day | F16M 11/18 248/183.4 |
| 4,655,426 | A | * | 4/1987 | von Dulong | A47B 9/04 108/147 |
| 4,842,233 | A | * | 6/1989 | Rusin | A47C 3/24 108/147 |

(Continued)

*Primary Examiner* — Terrell L McKinnon
*Assistant Examiner* — Michael McDuffie
(74) *Attorney, Agent, or Firm* — Reising Ethington P.C.

(57) ABSTRACT

A vehicle seat height adjuster is configured to allow for a vertically oriented motor and spindle system. A ring-shaped lift plate allows the motor and spindles to pass through the lift plate, thereby allowing the lift plate to travel closer to the vehicle floor while eliminating the need for levered mechanical armature systems and complex transmission systems that convert motor rotation about a horizontal axis to vertical seat movement. The vehicle seat adjuster also offers pure vertical movement in the direction of the motor axis and has a relatively small footprint due in part to most of the components being located within a perimeter of the lift plate when retracted.

20 Claims, 3 Drawing Sheets

(56) References Cited

U.S. PATENT DOCUMENTS

| | | | | |
|---|---|---|---|---|
| 5,078,357 A * | 1/1992 | Mosetich | B62K 19/36 248/157 |
| 5,090,513 A * | 2/1992 | Bussinger | B60K 28/04 180/271 |
| 5,163,650 A * | 11/1992 | Adams | B60Q 1/2657 248/354.4 |
| 5,222,710 A * | 6/1993 | White | B60N 2/067 248/405 |
| 5,234,187 A * | 8/1993 | Teppo | A47B 9/06 248/161 |
| 5,427,337 A * | 6/1995 | Biggs | A61G 15/02 248/157 |
| 5,620,230 A * | 4/1997 | Wu | A47C 1/06 248/405 |
| 6,095,476 A * | 8/2000 | Mathis | F16M 11/10 108/7 |
| 6,540,191 B2 * | 4/2003 | Liu | A47B 9/04 108/147 |
| 6,637,820 B2 * | 10/2003 | Rogers, III | A47C 1/023 248/161 |
| 6,766,995 B1 * | 7/2004 | Hsieh | F16M 11/18 248/404 |
| 6,915,998 B2 | 7/2005 | Borbe et al. | |
| 7,048,238 B2 * | 5/2006 | Rotondi | F16M 11/28 108/147 |
| 7,185,868 B2 * | 3/2007 | Wang | A47F 5/04 248/125.1 |
| 8,313,075 B2 * | 11/2012 | Kragh | A47B 9/12 248/157 |
| 8,439,324 B2 | 5/2013 | Hake et al. | |
| 8,621,960 B2 * | 1/2014 | Wrong | B60N 2/0296 74/665 A |
| 8,672,284 B2 * | 3/2014 | Klinke | A47B 9/04 248/405 |
| 8,789,804 B2 | 7/2014 | Shin | |
| 8,960,628 B2 | 2/2015 | Stanic et al. | |
| 9,139,110 B2 | 9/2015 | Bosecker et al. | |
| 2002/0030147 A1 * | 3/2002 | Stoelinga | A47B 9/06 248/188.2 |
| 2005/0236534 A1 * | 10/2005 | Bondesen | A47B 9/04 248/161 |
| 2009/0057520 A1 * | 3/2009 | Tada | B30B 15/068 248/419 |
| 2010/0301186 A1 * | 12/2010 | Chuang | A47B 9/00 248/422 |
| 2011/0031796 A1 * | 2/2011 | Hong | B60N 2/829 297/410 |
| 2011/0203496 A1 * | 8/2011 | Garneau | B60N 2/0232 108/147 |
| 2017/0008423 A1 | 1/2017 | Stanic et al. | |
| 2020/0031256 A1 * | 1/2020 | Werhahn | B60N 2/502 |

* cited by examiner

VEHICLE SEAT HEIGHT ADJUSTMENT MECHANISM

TECHNICAL FIELD

The present disclosure relates generally to vehicle seats and, in particular, to mechanisms for adjusting the position of vehicle seats within a vehicle.

BACKGROUND

Vehicle seats are typically adjustable in one or more aspects to accommodate a wide variety of sizes and preferences of seat occupants. Some adjustments are among different components of the same seat, such as the degree of tilt of a seat back with respect to a seat bottom. Other adjustments are relative to the body of the vehicle, such as fore-and-aft positioning or height adjustment. Various mechanisms have been proposed for seat adjustments, some of which are manual, and some of which are powered. Certain power-adjustable seats use electric motors coupled to the seat structure via transmission components to move one or more seat components to a desired position. Adjustment mechanism components are usually oriented with their longest dimension either substantially horizontal, or at a relative low angle with respect to the floor of the vehicle to save as much space under the seat as possible for other components or to enable adjustment of the seat closer to the floor.

This low-profile component orientation is conducive to horizontal seat adjustment because rotation of an electric motor about a horizontal axis is easily converted to linear movement in the direction of the axis, especially with the relative large amount of lateral space available under the seat. But conversion of such motor rotation to vertical motion usually requires complex power transmission systems and/or armature systems (e.g., scissor-lift systems). In U.S. Patent Application Publication No. 2017/0008423 by Stanic et al., an adjustment mechanism is disclosed in which the electric motor is oriented to rotate about a horizontal axis and includes a gear mechanism to convert the rotational motion of the motor to linear motion in a different horizontal direction. The mechanism is adapted to tilt to a small degree but offers no substantial vertical adjustment of the seat.

SUMMARY

In accordance with various embodiments, a seat height adjuster for use with a vehicle seat includes a mounting base, a lift plate, a powered actuator, and a transmission. The mounting base is adapted for attachment to a seat base, and the lift plate is adapted to be coupled with a seat pan of the vehicle seat. The actuator is mounted at a fixed location with respect to the mounting base and has an actuator shaft extending along an actuator axis. The transmission couples the actuator shaft to the lift plate such that, when the actuator is powered to move the actuator shaft with respect to the actuator axis, the lift plate moves with respect to the mounting base in the direction of the actuator axis between a retracted position and an extended position. The lift plate is below at least a portion of the actuator and the transmission when the lift plate is in the retracted position and the actuator axis is oriented vertically.

In some embodiments, the actuator is an electric motor and the transmission converts rotational motion of the actuator shaft to linear motion of the lift plate.

In some embodiments, the transmission includes a transmission shaft extending along a transmission axis that is offset from and parallel with the actuator axis.

In some embodiments, the transmission shaft is a threaded shaft and the transmission further includes a threaded collar mounted at a fixed location with respect to the lift plate and engaged with the threaded shaft such that rotation of the threaded shaft about the transmission axis causes the lift plate to move in the direction of the transmission axis.

In some embodiments, the transmission includes a plurality of gears, including an actuator gear fixed to the actuator shaft for rotation with the actuator shaft about the actuator axis. The transmission further includes a transmission gear fixed to the threaded shaft for rotation with the threaded shaft about the transmission axis. The actuator gear and the transmission gear are intermeshed so that rotational motion of the actuator shaft about the actuator axis is converted to linear movement of the lift plate along the transmission axis.

In some embodiments, the threaded shaft is one of a plurality of threaded shafts, and the threaded collar is one of a corresponding plurality of threaded collars. Each threaded shaft extends along a corresponding transmission axis that is offset from and parallel with the actuator axis, and each threaded collar is mounted at a fixed location with respect to the lift plate and engaged with one of the threaded shafts. The transmission gear is one of a plurality of transmission gears. Each transmission gear is fixed to a corresponding one of the threaded shafts for rotation therewith about the corresponding transmission axis, and each transmission gear is intermeshed with the actuator gear so that rotational motion of the actuator shaft about the actuator axis is converted to linear movement of the lift plate along the transmission axes.

In some embodiments, the transmission includes a plurality of threaded shafts and a corresponding plurality of threaded collars. Each threaded shaft extends along a corresponding transmission axis that is offset from and parallel with the actuator axis, and each threaded collar is mounted at a fixed location with respect to the lift plate and engaged with one of the threaded shafts such that rotation of the threaded shafts about the respective transmission axes causes the lift plate to move in the direction of the transmission axes.

In some embodiments, the threaded shafts are equally spaced from the actuator shaft in a radial direction and equally spaced from each other in a circumferential direction about the actuator axis.

In some embodiments, the transmission includes a plurality of intermeshed gears that convert rotational motion of the actuator shaft to rotational motion of the threaded shafts.

In some embodiments, the transmission includes a transmission shaft extending along a transmission axis that is offset from and parallel with the actuator axis, and the lift plate at least partly circumscribes the actuator and the transmission shaft when in the retracted position.

In some embodiments, the lift plate comprises a ring that circumscribes the actuator and at least a portion of the transmission when in the retracted position.

In some embodiments, the transmission includes a pair of threaded shafts and a pair of threaded collars. The pair of threaded shafts extend along a corresponding pair of transmission axes equally spaced about the actuator axis. Each transmission axis is offset from and parallel with the actuator axis and within a perimeter of the ring. The pair of threaded collars is coupled with the lift plate along the perimeter of the ring at fixed locations with respect to the lift plate. Each threaded collar is engaged with one of the threaded shafts such that rotation of the threaded shafts about the transmission axes causes the lift plate to move in the direction of the transmission axes.

In some embodiments, the seat height adjuster includes a lift plate guide mounted at a fixed location with respect to the mounting base and extending along a guide axis offset from and parallel with the actuator axis. The lift plate guide is engaged with a guide follower of the lift plate.

In some embodiments, the seat height adjuster includes a housing mounted at a fixed location with respect to the mounting base and at least partly surrounding the actuator. The housing extends from one end at the mounting base to an opposite end away from the mounting base. The transmission includes a threaded shaft and a threaded collar. The threaded shaft extends along a transmission axis that is offset from and parallel with the actuator axis and the guide axis. A first end of the threaded shaft is rotationally coupled with the mounting base, and an opposite second end of the threaded shaft is rotationally coupled with the housing. The lift plate guide is mounted along a wall of the housing such that the housing defines a constant distance between the transmission axis and the guide axis.

In some embodiments, the lift plate includes a ring that circumscribes the actuator, the housing, the threaded shaft, and the lift plate guide when the lift plate is in the retracted position.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENTS

The vehicle seat height adjuster described below is configured to allow for a vertically oriented actuator and spindle system. Space beneath the seat is saved by allowing the actuator and mechanical transmission components to pass through a lift plate of the adjuster so that the lift plate can travel closer to the vehicle floor. The need for levered mechanical armature systems and complex transmission systems that convert motor rotation about a horizontal axis to vertical seat movement is eliminated, and purely vertical seat movement is available in the direction of an actuator axis. The apparatus has a relatively small footprint due in part to most of the components being located within a perimeter of the lift plate when retracted.

Figure 1:
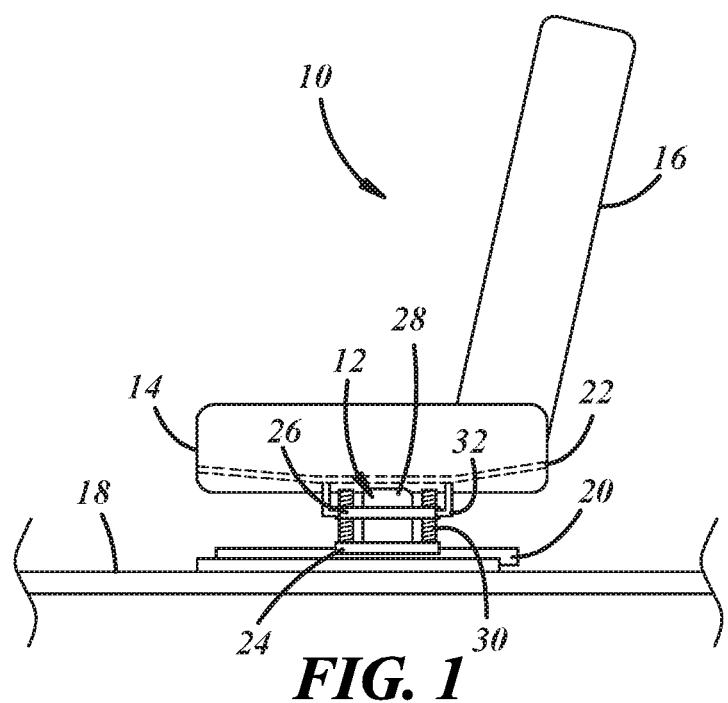
FIG. 1 is a schematic side view of a vehicle seat equipped with a seat height adjuster.

FIG. 1 is a side view of a vehicle seat 10 schematically illustrating some of the components of a seat height adjuster 12 in relation to the seat. The figure is not to scale, and some components may be enlarged for purposes of illustration. The seat 10 includes a seat bottom 14 and a seat back 16 extending therefrom. The seat 10 is adapted to be coupled with a floor 18 of the vehicle in which it is installed and includes a seat base 20 supporting a seat pan 22 along the bottom side of the seat bottom 14. In this case, the seat base 20 slides along longitudinal rails fixed to the vehicle floor 18.

The seat height adjuster 12 operates to change the distance between the seat 10 and the vehicle floor 18 by moving the seat pan 22 relative to the seat base 20 in the vertical direction. The seat height adjuster 12 includes a mounting base 24, a lift plate 26, an actuator 28, and a transmission 30. The mounting base 24 is adapted for attachment to the seat base 20 such that the seat base and mounting base move together as one piece, such as during fore-and-aft adjustment of the seat. The lift plate 26 is adapted for coupling with the seat pan 22 such that the seat pan and lift plate move together when the lift plate moves. The seat pan 22 can be any underlying structure of the seat 10 or seat bottom 14, and the seat base 20 can be any component that supports the seat pan 22 with respect to the vehicle floor 18, including the floor itself in some cases.

The actuator 28 is a powered device including at least one component that moves when powered. An electrically powered motor in which a rotor shaft is the moving component is one example of a suitable actuator. Electric solenoids, hydraulic or pneumatic cylinders, and fluid motors are other non-limiting examples. The transmission 30 includes one or more components that transmit movement from the actuator 28 to the lift plate 26 and may include gears, lead screws, push rods, linkages, armatures, pistons, cylinders, and various other components. The transmission 30 includes a continuous coupling between the actuator 28 and the lift plate 26 and among all of the individual components of the transmission.

FIG. 1 illustrates the seat 10 equipped with one seat height adjuster 12 centrally located with respect to the transverse directions of the seat. Other examples include more than one seat height adjuster, such as one in each quadrant of the seat bottom 14, or one in each of two front quadrants that raise and lower the front of the seat about a pivot axis along the back of the seat. In the illustrated example, the lift plate 26 is coupled with the seat pan 22 via a coupler 32. The coupler 32 extends away from the lift plate 26 toward the seat pan and may act as a spacer between the two components so that the top of the actuator 28 does not touch the seat pan when the lift plate is in a retracted position. In one particular embodiment, the coupler 32 is configured to allow rotation of the seat pan about a vertical axis and tilting of the seat pan about multiple horizontal axes. In another example, the seat pan 22 includes a recess which accommodates a portion of the seat height adjuster 12 when the seat is lowered. In other examples, the coupler 32 is a bracket that acts primarily as a spacer.

Figure 2:
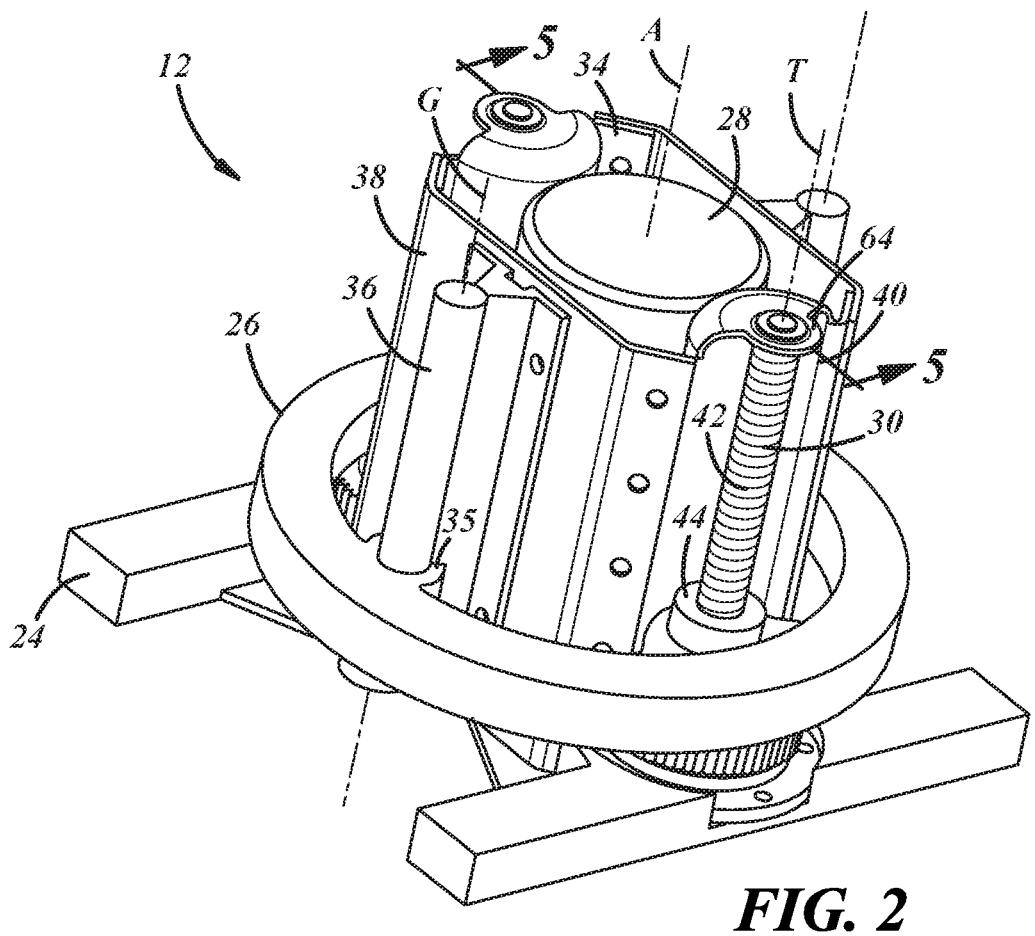
FIG. 2 is an enlarged top isometric view of the seat height adjuster of FIG. 1.

FIG. 2 is an enlarged isometric top view of an embodiment of the seat height adjuster 12 of FIG. 1 illustrating the mounting base 24 and lift plate 26 along with portions of the actuator 28 and transmission 30. The mounting base 24 of FIG. 1 is formed as a pair of laterally spaced elongate members connected by one or more lateral cross-members. The lift plate 26 is in the form of a ring and is shown in the retracted position in which its distance from the mounting base 24 at its lowest. The illustrated height adjuster 12 also includes a housing 34 surrounding the actuator 28, along with a pair of lift plate guides 36 supported by the housing. The mounting base 24 and lift plate 26 may be formed from structural materials such as ferrous or aluminum alloys, various metals, and/or structural composite materials.

The housing 34 is attached to the mounting base 24 at a fixed location with respect to the mounting base and extends from a lower end at the mounting base to an opposite end away from the mounting base. The particularly illustrated housing 34 is formed from four pieces, including a pair of straight walls 38 and a pair of curved walls 40. The housing walls 38, 40 may be formed from structural materials such as sheet metal or structural composites. The straight walls 38 are located on opposite sides of the actuator 28, and each wall 38 has angled flanges at lateral ends of a flat central portion. The flanges of each of the opposite walls 38 are formed toward each other. The curved walls 40 are located on different opposite sides of the actuator 28, and each wall 40 has angled flanges at opposite ends of an arcuate or otherwise curved central portion. The curved walls 40 are oriented with concave sides facing away from each other and with the flanges formed toward the opposite wall. The straight walls 38 and curved walls 40 are in an alternating arrangement around the actuator 28 to form the housing 34, with adjacent walls attached together where their respective angled flanges overlap. The housing 34 thus has a beam-like structure with very high stiffness in lateral directions with a relatively minimal cross-sectional area. Various other housing cross-sections are possible, and there is no requirement that any of the walls be any particular shape.

Each lift plate guide 36 is mounted at a fixed location with respect to the mounting base 24 and extends along a guide axis (G) that is offset from and parallel with an actuator axis (A) and a transmission axis (T). Each lift plate guide 36 is mounted along a wall of the housing 34 such that the housing defines a constant distance between the transmission axis (T) and the guide axis (G). The illustrated lift plate guides 36 are cylindrical rods that are slidingly engaged with guide followers 35 of the lift plate 26 (e.g., via bushings) and are mounted to the housing 34 via brackets that extend along the full length of the guides. The guides 36 vertically guide the lift plate 26 during movement between the illustrated retracted position and an extended position in which the lift plate is spaced farther away from the mounting base 24. Together, the guides 36 and the housing 34 bear lateral and/or radial loads applied to the lift plate 26 to help minimize side loads on components of the transmission 30.

The illustrated transmission 30 includes a pair of transmission shafts 42 and a corresponding pair of collars 44. Each transmission shaft 42 extends along a corresponding transmission axis (T) that is offset from and parallel with the actuator axis (A). In this example, the transmission shafts 42 are externally threaded shafts or spindles, and the collars 44 are internally threaded. Each threaded shaft 42 is rotationally coupled at fixed locations with the mounting base 24 at one end and with the housing 34 at the other end. When the threaded shafts 42 rotate about their respective transmission axes (T), the threaded collars 44 move along the transmission axes.

Each threaded collar 44 is mounted at a fixed location with respect to the lift plate 26 and engaged with one of the threaded shafts 42. Rotation of the threaded shafts 42 about the transmission axes (T) thereby causes the lift plate 26 to move in the direction of the transmission axes. In this example, the collars 44 are made as separate pieces from the lift plate 26 and pressed into openings or otherwise affixed to the lift plate. In other examples, the lift plate 26 includes threaded openings in a collar that is formed integrally as one piece with the lift plate. In other embodiments, the transmission shafts 42 have a uniform cross-section (e.g., a cylindrical rod), and the collars 44 include internal bushings with different actuation mechanism.

Figure 3:
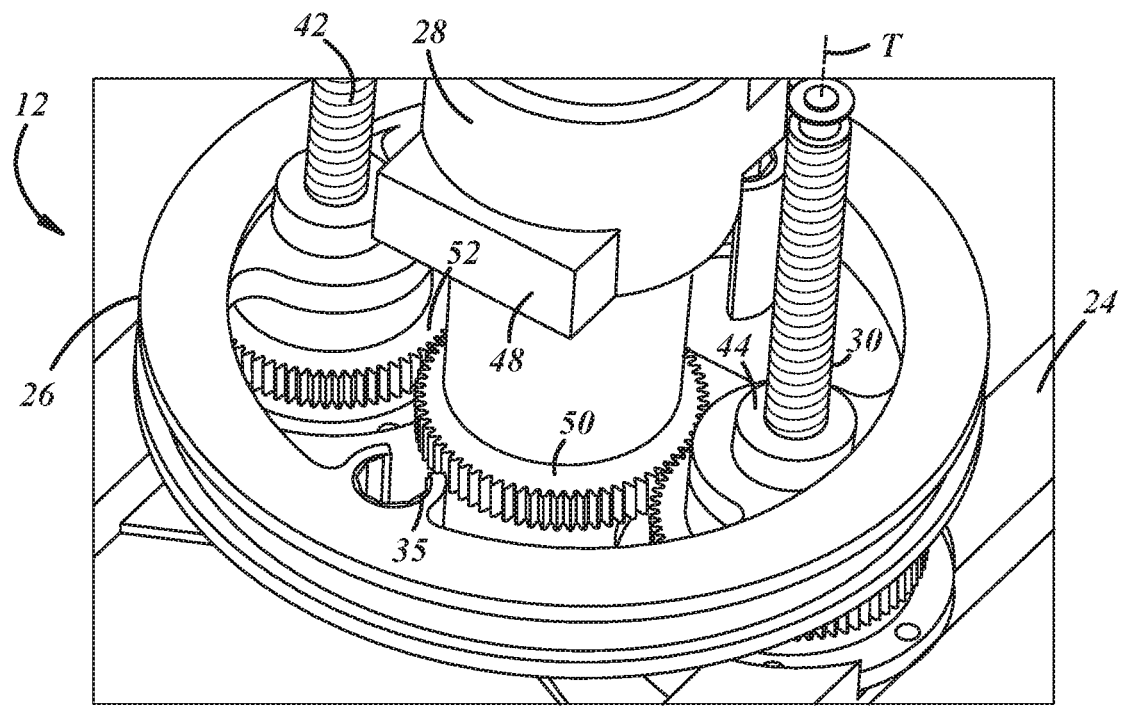
FIG. 3 is an enlarged view of the seat height adjuster of FIG. 2 with the housing and lift plate guides omitted.

FIG. 3 is an enlarged view of the seat height adjuster 12 of FIG. 2 with the housing 34 and guides 36 omitted to illustrate more of the actuator 28 and transmission 30. The actuator 28 is mounted at a fixed location with respect to the mounting base 24 and has an actuator shaft 46 extending along the actuator axis (A) (see FIGS. 5 and 6). In this example, the actuator 28 is an electric motor or other rotational actuator. The shaft 46 extends downward from the motor in a direction toward the mounting base 24 and is configured to rotate with an internal rotor of the motor when powered. The motor 28 may have a generally round housing as shown and may include protrusions 48 or other features to facilitate attachment to a wall of the above-described housing 34 or to a bracket used for mounting the motor in a fixed position relative to the base 24. The motor housing may also include provisions for electrical connectors power or sensor leads.

An actuator gear 50 is fixed to the actuator shaft 46 for rotation with the actuator shaft about the actuator axis. The actuator gear 50 is one of a plurality of gears of the illustrated transmission 30, which also includes a pair of transmission gears 52 fixed to respective threaded shafts 42 for rotation with the threaded shafts about the transmission axes (T). The actuator gear 50 and the transmission gears 52 are intermeshed so that rotational motion of the actuator shaft about the actuator axis is converted to rotational motion of the transmission gears 52 and their associated shafts 42 about the respective transmission axes (T). The transmission 30 of the embodiment illustrated in FIGS. 2 and 3 is thus a mechanical transmission that includes the actuator gear 50, the transmission gears 52, the threaded shafts 42, and the threaded collars 44. The transmission 30 couples the actuator shaft 46 to the lift plate 26 such that, when the actuator 28 is powered to move the actuator shaft with respect to the actuator axis, the lift plate moves with respect to the mounting base 24 in the direction of the actuator axis between the retracted position and the extended position.

Rotational movement about a vertical axis is thus converted to purely vertical linear movement by the transmission 30 in an elegant arrangement that does not require complex armatures with multiple pivot points or gearboxes in which the gears rotate about axes in multiple different orientations. The seat height adjuster 12 can be made with a relatively small footprint and a low-profile height due in part to its components being arranged so that the lift plate 26 is below at least a portion of the actuator 28 and/or at least a portion of the transmission 30 when in the retracted position. The shafts 42 and collars 44 may be arranged along axes (T) that are offset from the actuator axis (A) as illustrated, which uses less vertical space than using a threaded actuator shaft to move a threaded collar the desired amount. Also, the actuator 28 and transmission 30 can be located within a perimeter of the lift plate 26, due in part to a central opening of the lift plate through which the actuator 28 and shafts 42 are allowed to pass during movement between the retracted and extended positions.

Figure 4:
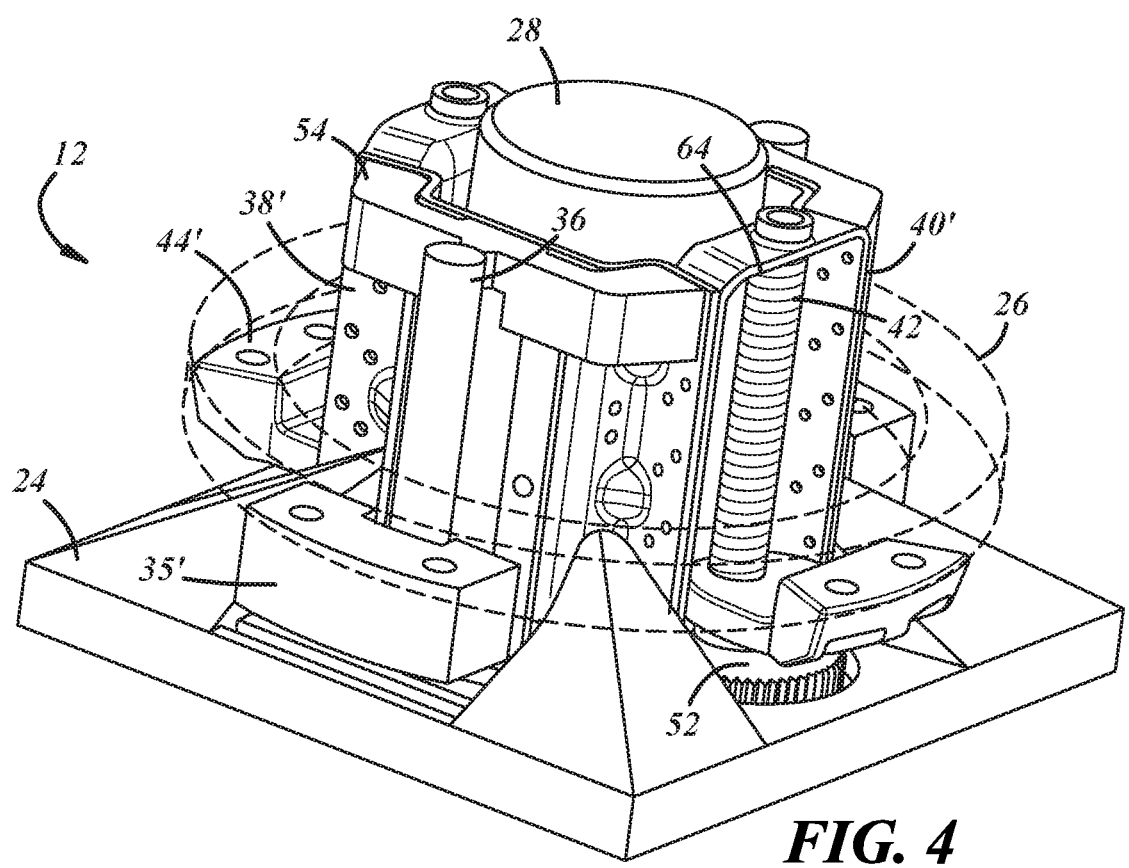
FIG. 4 is a modified example of the seat height adjuster of FIG. 2.

FIG. 4 is an isometric top view of another embodiment of the seat height adjuster 12 with the lift plate 26 shown in phantom only. FIG. 4 primarily illustrates examples of changes from the example of FIG. 2 that may be used to strengthen and/or stiffen components of the seat height adjuster 12. For instance, the straight walls 38 of the housing 34 of FIG. 2 are modified, with the corresponding walls 38' of FIG. 4 having double flanges along opposite lateral ends of the central portions. The curved walls 40 of FIG. 2 are changed to have a shallower concave portion and less curvature along the corresponding walls 40' of FIG. 4. Reinforcement bars 54 are also added along the open end of the housing 34, and the height of the housing and guides 36 is less than in FIG. 2. The mounting base 24 includes more solid material than in FIG. 2 and is in the form of a solid plate with pyramidal reinforcement portions along each of the corners.

The guide followers 35' of FIG. 4 are formed separately from the lift plate 26 and the transmission collars 44' are formed with radially offset mounting portions configured for attachment to the lift plate. These two differences from the embodiment of FIGS. 2 and 3 allow the lift plate 26 to be formed in a simpler manner as an annular ring with circular inner and outer perimeters. Lift plate mounting surfaces of the collars 44' of FIG. 4 are also offset vertically upward with respect to the threaded portion of the collars to compensate for the reduced height of the guides 36 and transmission shafts 42 compared to FIG. 2. One or both of the modified guide followers 35' and collars 44' could alternatively be formed integrally as one piece with the lift plate 26, as in the example of FIGS. 2 and 3. Operation of the different examples of FIGS. 2-4 is substantially the same.

Figure 5:
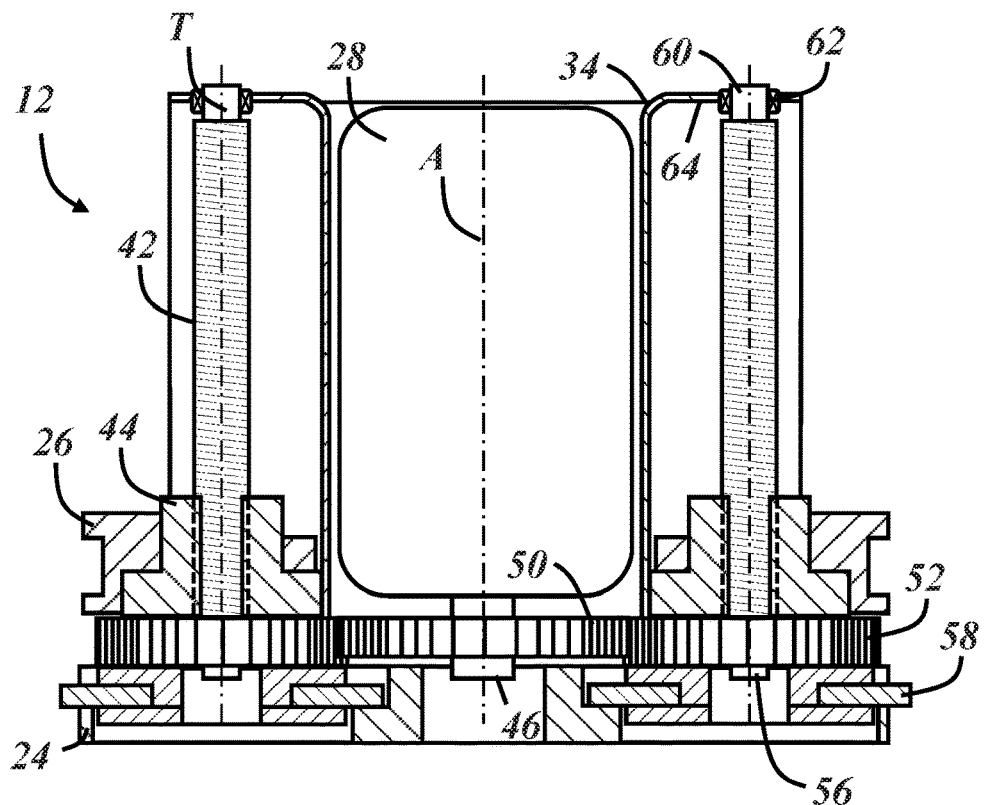
FIG. 5 is a cross-sectional view of the seat height adjuster of FIG. 2 with the lift plate in a retracted position.
Figure 6:
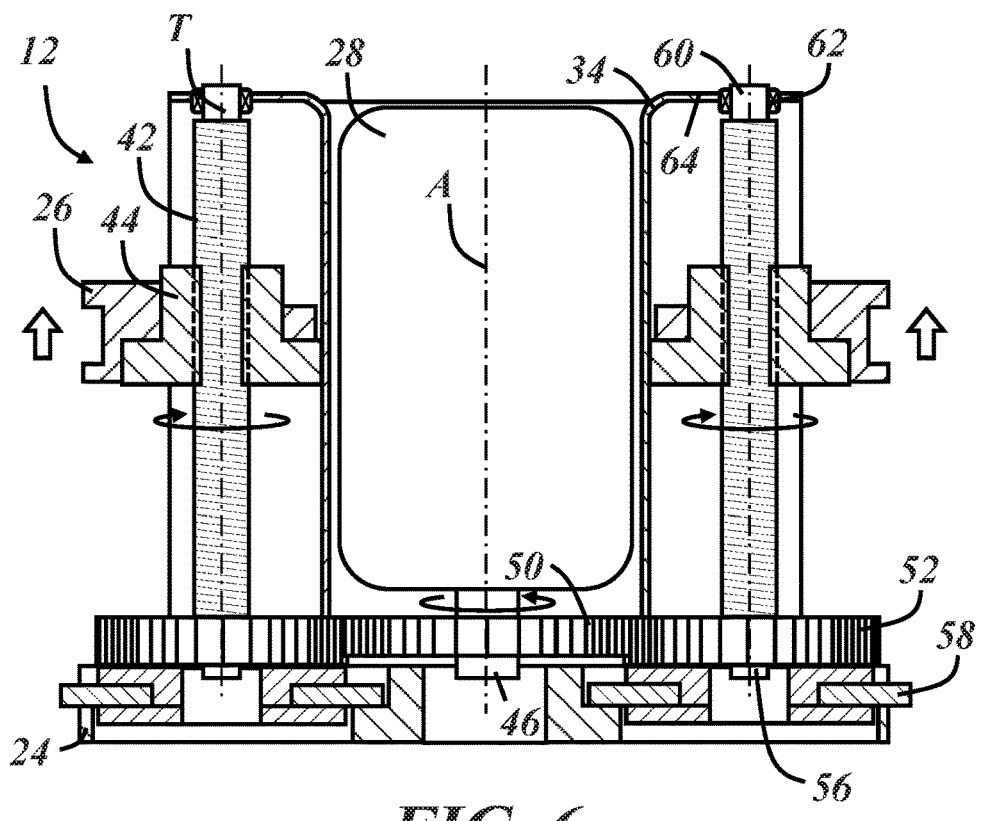
FIG. 6 is the view of FIG. 5 with the lift plate moved toward an extended position.

FIG. 5 is a cross-sectional and partially cutaway view of the seat height adjuster 12 of FIG. 2 with the lift plate 26 illustrated in the retracted position, and FIG. 6 is the same view with the lift plate in an extended position and moving toward a fully extended position. These figures additionally illustrate an exemplary manner in which the transmission shafts 42 are rotationally coupled with the mounting base 24 and with the housing 34. A first end 56 of each transmission shaft 42 is rotationally coupled with the mounting base via a rotational bearing 58. In this particular example, the bearings 58 are ring bearings configured to bear axial loads. An inner ring of each ring bearing 58 is affixed to the transmission gear 52 that is affixed to the corresponding transmission shaft 42, and an outer ring of each ring bearing is affixed to the mounting base. In this construction, the outer ring of the bearing is the stationary portion while the inner ring rotates with the gear 52 and shaft 42. As illustrated in the figures, the bearings 58 may be located in a recess formed in the base 24. Other arrangements and bearing types are possible, such as the first end 56 of the shaft 42 being fixed directly to one side of a bearing rather than via the gear 52.

An opposite second end 60 of each transmission shaft 42 is rotationally coupled with the housing 34 via another rotational bearing 62. This bearing 62 may be a roller bearing or a low friction bushing and is not required to bear a significant axial load like the bearings 58 at the first end 56. The bearing 62 is supported by the housing 34 and, in particular, by one of the walls 40 of the housing. A laterally extending end portion 64 of the curved wall 40 of the housing supports the bearing 62 along the corresponding transmission axis (T). In the illustrated examples, the laterally extending end portion 64 is formed as an integral part of the wall 40 from the same piece of material (e.g., sheet metal), but the end portion could also be a separately provided piece attached to the housing.

Each of the embodiments of FIGS. 2-6 includes corresponding pairs of transmission shafts 42, collars 44, transmission gears 52, and guides 36. It is contemplated that a different number of these components could be included while still reaping the benefits of the disclosed seat height adjuster 12. Where more than a pair of any of these components is employed, the transmission shafts 42 and/or the guides 36 may be equally spaced about the actuator axis in a radial direction and equally spaced from each other in a circumferential direction about the actuator axis, as is the case in the illustrated embodiments that include two of each component. Such an arrangement helps with load distribution throughout the seat height adjuster.

It is also contemplated that different gearing arrangements and/or non-gearing arrangements can be employed in the transmission 30. The transmission 30 may include a plurality of intermeshed gears that convert rotational motion of the actuator shaft to rotational motion of the transmission shafts as in the illustrated examples. Or the transmission 30 may include a plurality of gears that converts rotational motion of the actuator shaft to a different type of motion or to rotational motion about an axis in a different orientation from the actuator axis.

The lift plate 26 may be in the form of a ring as in the illustrated embodiments, but this is not necessary. The lift plate 26 can be shaped to fully or only partially circumscribe the actuator 28, transmission shaft(s) 42, and/or guides 36 when in the retracted position. The outer perimeter of the lift plate 26 can be any shape and any size. The inner perimeter of the lift plate can be any shape and can be any size sufficient to allow at least a portion of the actuator 28, guides 36, and/or the desired transmission components to pass through the lift plate when in the retracted position. The lift plate 26 also does not have to be in the form of an enclosed shape—i.e., the central opening of the illustrated ring could be extended to the outer perimeter to form an open shape such as a C-shape.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A seat height adjuster for use with a vehicle seat, the seat height adjuster comprising:
 a mounting base adapted for attachment to a seat base;
 a lift plate adapted to be coupled with a seat pan of the vehicle seat;

a powered actuator mounted at a fixed location with respect to the mounting base, the actuator having an actuator shaft extending along an actuator axis;

a transmission that couples the actuator shaft to the lift plate such that, when the actuator is powered to move the actuator shaft with respect to the actuator axis, the lift plate moves with respect to the mounting base in the direction of the actuator axis between a retracted position and an extended position;

a lift plate guide mounted at a fixed location with respect to the mounting base and extending along a guide axis offset from and parallel with the actuator axis, wherein the lift plate guide is engaged with a guide follower of the lift plate; and a housing mounted at a fixed location with respect to the mounting base and at least partly surrounding the actuator, the housing extending from one end at the mounting base to an opposite end away from the mounting base, wherein the lift plate is below at least a portion of the actuator and the transmission when the lift plate is in the retracted position and the actuator axis is oriented vertically, wherein the transmission includes a threaded shaft and a threaded collar, the threaded shaft extending along a transmission axis that is offset from and parallel with the actuator axis and the guide axis, a first end of the threaded shaft being rotationally coupled with the mounting base and an opposite second end of the threaded shaft being rotationally coupled with the housing, wherein the lift plate guide is mounted along a wall of the housing such that the housing defines a constant distance between the transmission axis and the guide axis.

2. A seat height adjuster as defined in claim 1, wherein the lift plate comprises a ring that circumscribes the actuator, the housing, the threaded shaft, and the lift plate guide when the lift plate is in the retracted position.

3. A seat height adjuster for use with a vehicle seat, the seat height adjuster comprising:

a mounting base adapted for attachment to a seat base;

a lift plate adapted to be coupled with a seat pan of the vehicle seat;

a powered actuator mounted at a fixed location with respect to the mounting base, the actuator having an actuator shaft extending along an actuator axis;

a transmission that couples the actuator shaft to the lift plate such that, when the actuator is powered to move the actuator shaft with respect to the actuator axis, the lift plate moves with respect to the mounting base in the direction of the actuator axis between a retracted position and an extended position;

a housing mounted at a fixed location with respect to the mounting base and at least partly surrounding the actuator, the housing extending from one end at the mounting base to an opposite end away from the mounting base; and a lift plate guide mounted at a fixed location with respect to the housing and configured to guide the guide plate between the retracted and extended positions, wherein the lift plate is below at least a portion of the actuator, the transmission, and the housing when the lift plate is in the retracted position and the actuator axis is oriented vertically, and wherein the lift plate comprises a ring that substantially circumscribes the actuator, the housing, a threaded shaft of the transmission, and the lift plate guide when the lift plate is in the retracted position.

4. A seat height adjuster as defined in claim 3, wherein the lift plate guide extends along a guide axis, the threaded shaft rotates about a transmission axis when the actuator is powered, and the guide axis and the transmission axis are parallel with the actuator axis.

5. A seat height adjuster as defined in claim 3, wherein the actuator shaft rotates about the actuator axis in a first rotational direction and the threaded shaft rotates about a transmission axis in a second rotational direction that is opposite the first rotational direction when the actuator is powered.

6. A seat height adjuster as defined in claim 3, wherein the powered actuator comprises an electric motor.

7. A seat height adjuster as defined in claim 3, wherein the transmission converts rotational motion of the actuator shaft to linear motion of the lift plate.

8. A seat height adjuster as defined in claim 3, wherein the threaded shaft extends along a transmission axis that is offset from and parallel with the actuator axis.

9. A seat height adjuster as defined in claim 3, wherein the transmission further comprises a threaded collar mounted at a fixed location with respect to the lift plate and engaged with the threaded shaft such that rotation of the threaded shaft about a transmission axis causes the lift plate to move in the direction of the transmission axis.

10. A seat height adjuster as defined in claim 3, wherein the transmission includes a plurality of gears, including an actuator gear fixed to the actuator shaft for rotation with the actuator shaft about the actuator axis and further including a transmission gear fixed to the threaded shaft for rotation with the threaded shaft about a transmission axis, the actuator gear and the transmission gear being intermeshed so that rotational motion of the actuator shaft about the actuator axis is converted to linear movement of the lift plate along the transmission axis.

11. A seat height adjuster as defined in claim 3, wherein the threaded shaft is one of a plurality of threaded shafts, and the transmission further comprises a corresponding plurality of threaded collars, each threaded shaft extending along a corresponding transmission axis that is offset from and parallel with the actuator axis, and each threaded collar being mounted at a fixed location with respect to the lift plate and engaged with one of the threaded shafts, and wherein the transmission further comprises a plurality of transmission gears, each transmission gear being fixed to a corresponding one of the threaded shafts for rotation therewith about the corresponding transmission axis, each transmission gear being intermeshed with an actuator gear so that rotational motion of the actuator shaft about the actuator axis is converted to linear movement of the lift plate along the transmission axes.

12. A seat height adjuster as defined in claim 3, wherein the transmission includes a plurality of threaded shafts and a corresponding plurality of threaded collars, each threaded shaft extending along a corresponding transmission axis that is offset from and parallel with the actuator axis, and each threaded collar being mounted at a fixed location with respect to the lift plate and engaged with one of the threaded shafts such that rotation of the threaded shafts about the respective transmission axes causes the lift plate to move in the direction of the transmission axes.

13. A seat height adjuster as defined in claim 12, wherein the threaded shafts are equally spaced from the actuator shaft in a radial direction and equally spaced from each other in a circumferential direction about the actuator axis.

14. A seat height adjuster as defined in claim 3, wherein the transmission includes a plurality of intermeshed gears that convert rotational motion of the actuator shaft to rotational motion of the threaded shaft.

15. A seat height adjuster as defined in claim 3, wherein the threaded shaft extends along a transmission axis that is offset from and parallel with the actuator axis.

16. A seat height adjuster as defined in claim 3, wherein the ring fully circumscribes the actuator and at least a portion of the transmission when in the retracted position.

17. A seat height adjuster as defined in claim 3, wherein the transmission comprises:

a pair of threaded shafts extending along a corresponding pair of transmission axes equally spaced about the actuator axis, each transmission axis being offset and parallel with the actuator axis and within a perimeter of the ring; and a pair of threaded collars coupled with the lift plate along the perimeter of the ring at fixed locations with respect to the lift plate, each threaded collar being engaged with one of the threaded shafts such that rotation of the threaded shafts about the transmission axes causes the lift plate to move in the direction of the transmission axes.

18. A seat height adjuster as defined in claim 3, wherein the lift plate guide is engaged with a guide follower of the lift plate.

19. A seat height adjuster as defined in claim 3, wherein the lift plate guide extends along a guide axis that is parallel with the actuator axis.

20. A seat height adjuster as defined in claim 3, wherein the actuator shaft and the threaded shaft rotate in opposite directions when the actuator is powered.

* * * * *